H. F. C. RIETSCHEL.
SPRING WHEEL.
APPLICATION FILED MAR. 11, 1914.
1,146,654.
Patented July 13, 1915.
2 SHEETS—SHEET 2.
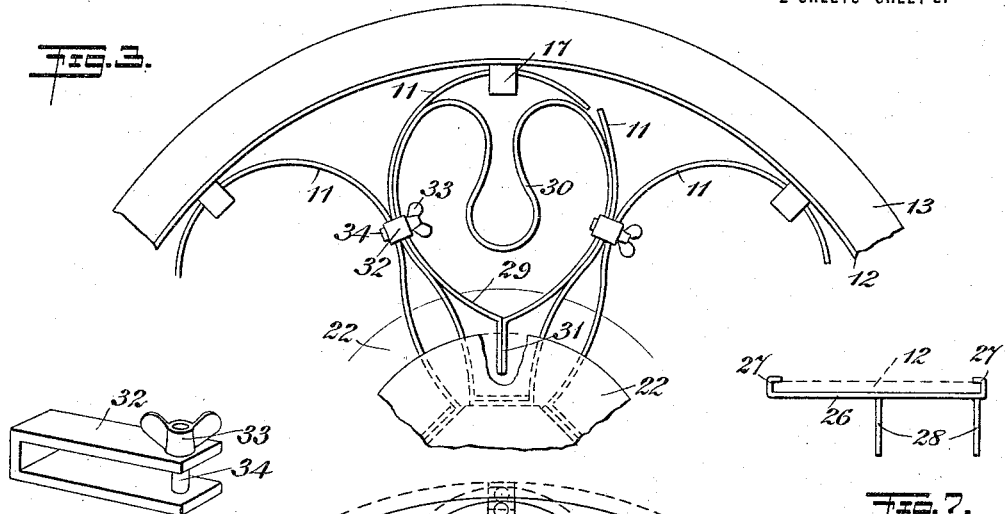
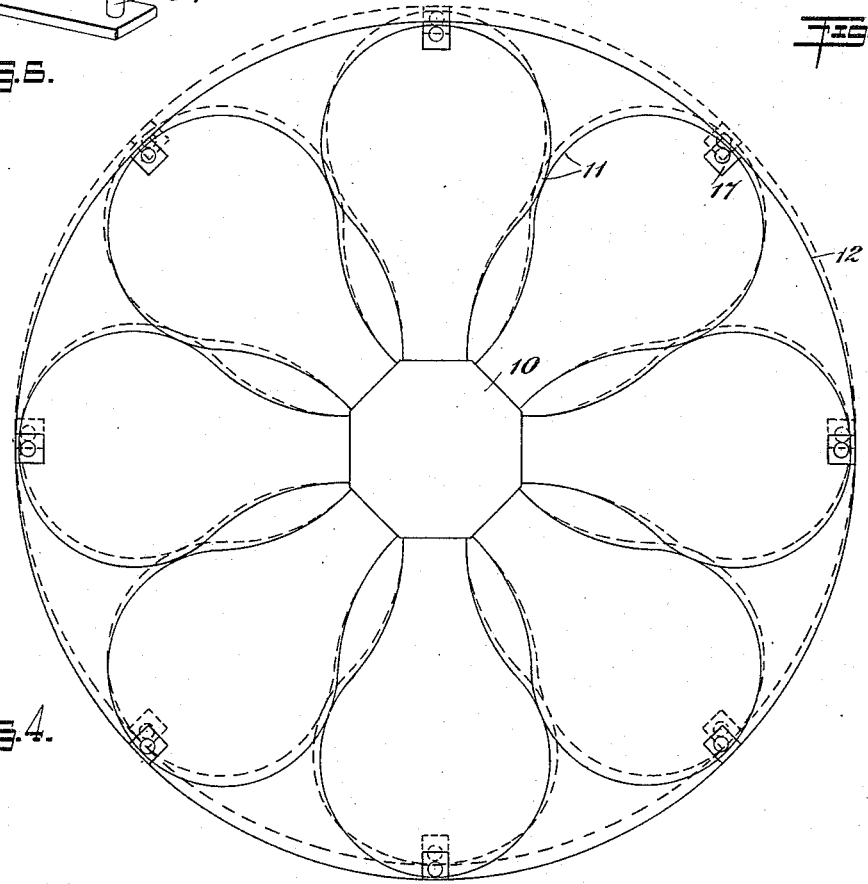
WITNESSES
INVENTOR
Henry F. C. Rietschel
BY
ATTORNEYS

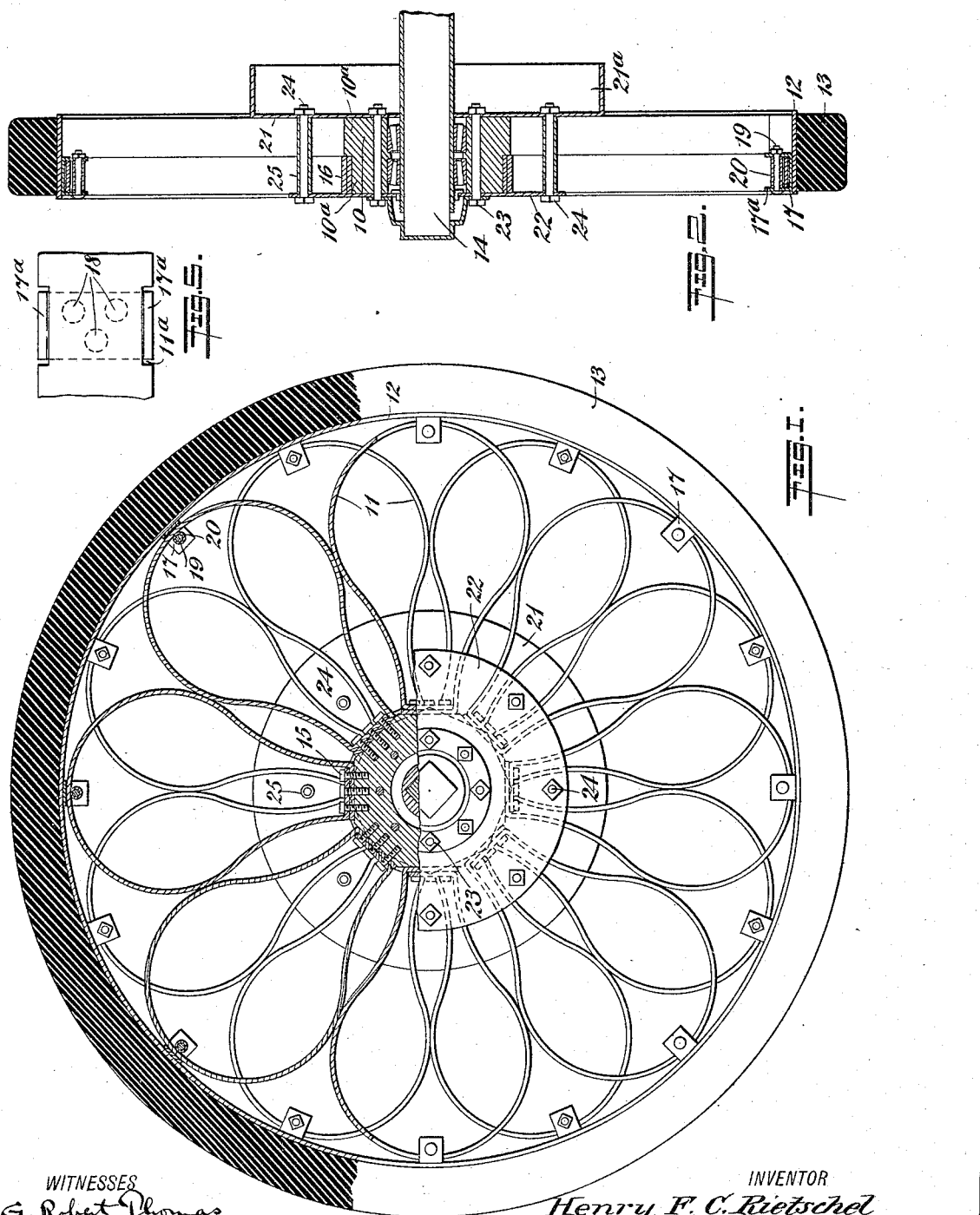

UNITED STATES PATENT OFFICE.

HENRY F. C. RIETSCHEL, OF NEW YORK, N. Y.

SPRING-WHEEL.

1,146,654. Specification of Letters Patent. Patented July 13, 1915.

Application filed March 11, 1914. Serial No. 823,933.

*To all whom it may concern:*

Be it known that I, HENRY F. C. RIETSCHEL, a subject of the Emperor of Germany, and a resident of the city of New York, borough of Brooklyn, in the county of Kings and State of New York, have invented a new and Improved Spring-Wheel, of which the following is a full, clear, and exact description.

This invention relates to carriages and wagons and has particular reference to vehicle wheels.

Among the objects of the invention is to provide a resilient wheel comprising a plurality of metallic springs and also having a flexible rim for the purpose of dispensing with the usual pneumatic tires now commonly used on automobiles and other vehicles.

Another object of the invention is to provide an easily applied emergency repair device should one or more of the springs become broken while on the road.

The foregoing and other objects of the invention will hereinafter be more fully described and claimed and illustrated in the drawings forming a part of this specification in which like characters of reference indicate corresponding parts in all the views, and in which—

Figure 1 is a side elevation, partly in vertical section, indicating a preferred embodiment of this invention; Fig. 2 is a vertical transverse section of the same; Fig. 3 is a view in side elevation indicating the application of the emergency repair device to a broken wheel; Fig. 4 is a diagram indicating the relative positions assumed by the rim and spring spokes when the wheel meets an obstruction; Fig. 5 is a detail view indicating the union between a spring and a clip coöperating with the same attached to the rim of the wheel; Fig. 6 is a perspective view of one of the clips for attaching the emergency repair device; and Fig. 7 is a detail view indicating a form of clip which may be used in emergency to hold a spring loop to the wheel rim.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring more particularly to the drawings, I show a wheel comprising a hub 10, spring spokes 11 and a metallic rim 12 to which may be connected a cushion tire 13 of any suitable construction. The hub, so far as its application to the axle 14 is concerned, may be of any suitable or preferred construction, and in this respect I claim no improvement. The periphery of the hub, however, is preferably formed with octagonal portions $10^a$, one portion having a series of faces to which are rigidly secured, by means of screws or bolts 15, the overlapping portions of feet 16, one spring 11 being secured through its feet 16 to each of the faces above referred to. The faces, however, and the springs secured thereto of each portion of the hub are arranged in staggered relation to those of the other hub portion, as shown in Fig. 1. In other words, all of the spring spokes 11 of the wheel are arranged in two parallel series and hence effectively support the wheel with respect to all strains subjected thereto.

The rim 12 is preferably made of flat material and hence has elasticity which is availed of in connection with the elasticity of the spring spokes. The several springs 11 are secured to the inner face of the rim 12 by clips 17. Each clip 17 is preferably U-shaped and is secured rigidly against the inner face of the rim by a plurality of rivets 18 located by dotted lines in Fig. 5. The rivets, however, do not pass through the spring loop but such loop is provided with notches or recesses $11^a$ having certain loose connection between the legs $17^a$ of the yoke, and the spring loop is maintained in such relation by means of a bolt 19 having an antifriction roller 20 thereon, as shown in Figs. 1 and 2.

On the inner and outer faces of the wheel are secured disks 21 and 22, the connection between them being through bolts 23 passing through them and the hub and also bolts 24 parallel to the other bolts but beyond the hub and having coöperating therewith a series of thimbles 25 constituting spacers allowing sufficient free movement of the springs between the disks. The inner disk 21 may support or constitute a brake wheel indicated at 21ª. These disks stiffen the wheel from lateral strains.

The clips 17 are of a substantial nature and are secured in such a manner by the rivets 18 that they seldom are the source of any difficulty on the road, but should one of them be broken a temporary holder to take its place may be employed, as shown in Fig. 7, the same comprising a malleable metal structure 26 having ends or hooks 27 adapted to engage over the edges of the rim 12 and having inwardly projecting fingers 28 which may be hammered into shape to overlap the spring 11. In the manufacture of the clips 26 one of the hooks 27 is left open, and after the other hook is engaged over an edge of the rim 12, the open hook is hammered over so as to make the clip secure.

The means for securing a spring to the hub and rim are such that it is a comparatively simple matter to renew or replace a broken one in the shop or even on the road by taking a little time, but for quick emergency repair purposes I provide a yoke 29, as shown in Fig. 3, the same conforming substantially to the inner form of the spring 11 but having a reëntrant loop 30 whereby flexibility is added to the device and conflict with the clip 17 is avoided. The point 31 of the yoke 29 is introduced between the disks 21 and 22 and between the leg portions of the broken spring 11. The side portions of the yoke 29 are then securely clamped by temporary clamps 32 to the side portions of the next adjacent unbroken springs 11. Each clamp includes two parallel jaws spanning the adjacent side portions of the springs and one of the side portions of the yoke 29 and is there secured by means of a thumb nut 33 and bolt 34. With the broken spring thus reinforced, it is obvious that the trip may be completed with reasonable safety and after the wheel is taken to a shop a new spring may readily be put in place of the broken one.

Having thus described my invention, I claim as new and desire to secure by Letters Patent:—

1. In a spring wheel, the combination of a hub, a flexible flat metal rim, a plurality of flexible looped spring spokes extending between the rim and the hub, means to secure the inner ends of the springs rigidly to the hub, and a series of clips secured to the inner face of the rim and having certain loose confining connection with the several springs, substantially as set forth.

2. In a spring wheel, the combination of a hub, a rim, a bowed spring spoke between the hub and the rim, detachable means rigidly securing the foot portions of the spring to the loop, a clip rigidly secured to the inner face of the rim and having spaced parts projecting inwardly toward the hub on opposite sides of the spring, there being certain free movement of the spring longitudinally through the clip, and an antifriction roller secured in the clip adjacent the inner face of the spring.

3. A vehicle wheel comprising a hub, a felly, spring spokes in the form of resilient loops attached at both extremities to the hub, and outer end spoke couplings attached to the felly and embodying rollers over which the middle portions of said loops are slidable.

In testimony whereof I have signed my name to this specification in the presence of two subscribing witnesses.

HENRY F. C. RIETSCHEL.

Witnesses:
 GEO. L. BEELER,
 PHILIP D. ROLLHAUS.

Copies of this patent may be obtained for five cents each, by addressing the "Commissioner of Patents, Washington, D. C."